United States Patent [19]
Sucech et al.

[11] Patent Number: 5,683,635
[45] Date of Patent: Nov. 4, 1997

[54] METHOD FOR PREPARING UNIFORMLY FOAMED GYPSUM PRODUCT WITH LESS FOAM AGITATION

[75] Inventors: Steven W. Sucech, Lake Villa, Ill.; Stewart E. Hinshaw, Sweetwater, Tex.; Bradley S. Nemeth, Bedford, Ind.; Kip R. Buster, Burlington, Iowa

[73] Assignee: United States Gypsum Company, Chicago, Ill.

[21] Appl. No.: 577,367

[22] Filed: Dec. 22, 1995

[51] Int. Cl.$^6$ ............................................. B29C 65/00
[52] U.S. Cl. ............... 264/42; 264/43; 264/171.1; 264/172.19; 156/39; 156/346
[58] Field of Search .................. 264/42, 43, 171.1, 264/172.19; 366/3, 5, 10, 11, 184, 191; 156/39, 346; 241/188.2, 246, 275

[56] References Cited

U.S. PATENT DOCUMENTS

| | | | |
|---|---|---|---|
| 1,660,243 | 2/1928 | Thomson . | |
| 2,639,901 | 5/1953 | Teale | 259/8 |
| 2,762,738 | 9/1956 | Teale | 154/87 |
| 2,985,219 | 5/1961 | Summerfield | 154/1 |
| 3,343,818 | 9/1967 | Plemons et al. | 259/147 |
| 3,454,688 | 7/1969 | Foster et al. | 264/42 |
| 3,459,620 | 8/1969 | McCleary et al. | 156/39 |
| 3,532,576 | 10/1970 | Proctor et al. | 156/39 |
| 3,625,724 | 12/1971 | Alvero | 366/10 |
| 3,929,947 | 12/1975 | Schwartz et al. | 264/42 |
| 4,057,443 | 11/1977 | Stilling et al. | 156/346 |
| 4,279,673 | 7/1981 | White et al. | 156/39 |
| 4,676,835 | 6/1987 | Green et al. | 106/111 |
| 4,735,755 | 4/1988 | Bischops | 264/42 |
| 5,085,929 | 2/1992 | Bruce et al. | 428/309.9 |
| 5,158,612 | 10/1992 | Savoly et al. | 106/678 |
| 5,240,639 | 8/1993 | Diez et al. | 252/307 |

FOREIGN PATENT DOCUMENTS

| | | |
|---|---|---|
| 0613764 | 9/1994 | European Pat. Off. . |
| 9516515 | 6/1995 | WIPO . |

OTHER PUBLICATIONS

Pending U.S. Patent Application Aug. 08/311,687, filed Sep. 23, 1994, "Producing Foamed Gypsum Board", S. W. Sucech.

*Primary Examiner*—Donald E. Czaja
*Assistant Examiner*—Michael P. Colaianni
*Attorney, Agent, or Firm*—David F. Janci; John M. Lorenzen

[57] ABSTRACT

The invention provides an improved method for preparing foamed gypsum products. The invention can utilize a single mixing chamber and significantly improve the efficiency of foaming agent usage. In the method of the invention the point of insertion of aqueous foam into calcined gypsum slurry is positioned such that the foam is agitated less than the calcined gypsum to thereby minimize destruction of the foam while still uniformly dispersing the foam in the calcined gypsum slurry. This is accomplished, for example, by locating an inlet for foam closer to the discharge outlet of a slurry mixing chamber than the location of the inlet for calcined gypsum or by locating the foam inlet in a discharge conduit connected to the discharge outlet of the slurry mixing chamber.

47 Claims, 4 Drawing Sheets

METHOD FOR PREPARING UNIFORMLY FOAMED GYPSUM PRODUCT WITH LESS FOAM AGITATION

FIELD OF THE INVENTION

This invention relates to a method and apparatus for preparing gypsum products (i.e., products comprising calcium sulfate dihydrate) from starting materials comprising calcined gypsum (i.e., calcium sulfate hemihydrate or anhydrite) and water. More particularly, the invention relates to an improved method and apparatus for preparing foamed gypsum products (i.e., gypsum products that are lightweight because they have voids uniformly distributed therein that are created by mixing an aqueous foam with the starting materials).

BACKGROUND

It is well known to produce gypsum products by uniformly dispersing calcined gypsum in water to form a slurry and then casting the slurry into a desired shaped mold or onto a surface and allowing the slurry to set to form hardened gypsum by reaction of the calcined gypsum (calcium sulfate hemihydrate or anhydrite) with the water to form hydrated gypsum (calcium sulfate dihydrate). It is also well known to produce a lightweight gypsum product by uniformly mixing an aqueous foam into the slurry to produce air bubbles therein. This will result in a uniform distribution of voids in the set gypsum product if the bubbles do not escape from the slurry before the hardened gypsum forms. The voids lower the density of the final product, which is often referred to as "foamed gypsum".

The aqueous foam employed in such a process is usually prepared just prior to its introduction into the calcined gypsum slurry. This is typically accomplished by mixing an appropriate foaming agent (of which many are well known) with water and then passing the mix through an apparatus which agitates the mix with air to produce the aqueous foam. Apparatus for accomplishing this is well known and is often referred to as a "foam generator".

The resultant foam will usually only be able to exist for a relatively short time, before its bubbles start to break, or coalesce with each other to form larger bubbles which then also break. Accordingly, it is desirable to produce the foam in a continuous manner in which a stream of the mix of foaming agent and water is directed to the foam generator, and a stream of the resultant aqueous foam leaving the generator is directed to and mixed with the calcined gypsum slurry.

The slurry itself is usually also produced in a continuous manner of inserting calcined gypsum and water (and the aqueous foam, when desired) into a mixing chamber containing means for agitating the contents to form a uniform aqueous dispersion (the slurry). The dispersion is continuously directed toward and through a discharge outlet of the mixing chamber and into a discharge conduit connected to the discharge outlet. The stream of slurry passes through the discharge conduit from which it is continuously cast into molds or onto a surface. The molds or surface are also continuously moving through the position where the slurry is being cast from the discharge conduit. The slurry then sets to form the hardened gypsum product by hydration while in the moving molds or on the moving surface. The product is then usually directed through a mildly heated zone (e.g., a kiln) to accelerate drying off of any excess water not taken up by the hydration reaction.

There are a number of problems associated with incorporating the aqueous foam in such a process, some of which involve competing considerations.

As previously mentioned, the bubbles of aqueous foam will begin to break, or coalesce and break, relatively shortly after their creation, especially when they come into contact with the calcined gypsum slurry. This is true even when the foam has been created by a foaming agent said to produce a so-called "tenacious" or "stable" foam. Thus, it would seem advantageous to minimize the time period between the creation of the foam and the formation of the hardened gypsum (which permanently preserves the voids created in the gypsum by the foam).

It is also known that agitation conditions producing relatively high shear forces can accelerate the coalescence and escape of aqueous foam bubbles that have been inserted into an aqueous calcined gypsum slurry, and the coalescence itself can lead to nonuniform sizes and distribution of the bubbles and resultant voids. So it might seem advantageous to limit the degree of shear force that a foam will encounter in the slurry.

On the other hand, and competing with the considerations above, it has been thought that a significant degree of agitation, in a typical mixing chamber provided with typical agitation means, is necessary to provide sufficiently uniform distribution of aqueous foam in a calcined gypsum slurry. But such a significant degree of agitation can lead to the problems noted above. (As used herein, the term, "agitation", is meant to collectively refer to the combination of shear forces and time spent under effect of such shear forces that a material being "agitated" experiences; e.g., stating that a material experiences a "higher degree" or a "higher amount" of "agitation" is meant to indicate that the material is being subjected to a higher intensity of shear force and/or is being subjected to a certain intensity of shear force for a longer period of time.)

Thus, a significant degree of agitation of the foam in a mixing chamber with calcined gypsum slurry has been thought to be necessary to avoid problems of nonuniform distribution, but that significant agitation can also cause problems of foam loss and nonuniform bubble and void size.

One approach to trying to achieve a level of agitation to balance these competing considerations has been to set up a system of two mixing chambers in succession. That is, the gypsum and water are added to a first mixing chamber that provides a relatively high degree of agitation to achieve an adequately uniform dispersion of calcined gypsum and water. The contents are then discharged to a second mixing chamber to which an aqueous foam is also added. The second mixing chamber provides a relatively lower degree of agitation to the mix, that it is hoped will be adequate to disperse the foam relatively uniformly in the slurry while not destroying any more of the foam or producing any larger variations in bubble size than is unavoidable. This approach is described, for example, in European Patent Application Publication 0 613 764 A1, published Sep. 7, 1994. However, this approach still poses problems. It can still result in relatively nonuniform foam dispersion and/or relatively high foam loss and nonuniform void sizes. It also requires the additional expense, complexity, and difficulty of providing two mixing chambers, maintaining them, and trying to keep them operating properly and in adequate balance to achieve a relatively acceptable compromise of results.

Another approach to the competing considerations is to increase the amount of foaming agent and resultant foam that is added to a system comprising a single mixing chamber. The system is then operated at whatever degree of agitation is necessary to achieve a uniform dispersion. Since an excess of foam has been added, it is hoped enough will survive to provide the desired void volume and reduction in weight to the gypsum product. However, the relatively high degree of agitation can still cause unpredictable coalescence and resultant nonuniform void sizes, and the excessive amount of foaming agent consumption can be rather expensive. The high concentration of foaming agent chemicals in the slurry can also adversely affect other properties of the gypsum product. This, in turn, can limit the amount of foaming agent that can be utilized, to the point where it is not possible in some cases to achieve the amount of void volume desired in the product.

Furthermore, some particular gypsum products and processes pose additional problems when it is desired to use aqueous foam to produce lighter weight.

When reducing the density of gypsum products, for example, gypsum board, by means of foam, there has long been concern about corresponding reductions in the strength of the gypsum. It has also long been thought that the strength of foamed gypsum board would be reduced the least by keeping the sizes of the voids in the gypsum as small as possible. More recently, it has been discovered that foamed gypsum strength is in fact best maintained by incorporating larger size voids in the gypsum. See, for example, U.S. Pat. No. 5,085,929 and copending U.S. patent application Ser. No. 08/311,687, filed Sep. 23, 1994.

One way of producing larger voids in foamed gypsum is to utilize a foaming agent that produces bubbles that are "unstable" in contact with calcined gypsum slurry, i.e., bubbles that quickly begin to coalesce to form larger bubbles in the slurry. However, such unstable foams suffer even more from the previously mentioned problem of loss of foam when subjected to typical mixing chamber agitation thought necessary to uniformly disperse foam in the slurry. This leads to the need to utilize even higher excess amounts of foam, at even higher expense, and, in some cases, leads to inability to use enough foaming agent to produce enough surviving foam without adversely affecting other properties of the gypsum product. This problem can be reduced somewhat by the incorporation of a small amount of foaming agent that produces "stable" foam along with the agent producing "unstable" foam (as described, for example, in copending U.S. patent application Ser. No. 08/311,687), but the total usage of foaming agent is still higher than is desirable.

Another problem particular to the production of gypsum board concerns those processes designed to produce boards with harder edges. As described, for example, in U.S. Pat. Nos. 2,985,219 and 4,279,673, it is desirable, for various reasons, to produce foamed gypsum board having edges that are denser and harder than the mid-portion (often referred to as the "core" portion) of the board. Those Patents describe various methods for accomplishing this, such as diverting a portion of the foamed slurry from the main "core" slurry mixing chamber. The diverted portion is then treated separately in one or more supplementary mixers with high agitation and/or defoaming agents to remove all or most of the foam and thus produce a harder, denser "edge" slurry to be cast in two streams in contact with the sides of the cast "core" slurry stream. This results in a gypsum board product with the desired harder, denser edges, but it requires the added cost and complications of extra mixers and chemicals. It also, in effect, wastes the foam that is removed from the edge slurry and wastes the foaming agent and effort that was used to produce that foam.

Thus, there is a continuing need for new and improved methods and apparatus for preparing foamed gypsum products that solve, avoid, or minimize all of the problems noted above. The present invention meets this need.

SUMMARY OF THE INVENTION

The present inventors have unexpectedly found that in gypsum preparation processes employing typical gypsum slurry mixing chambers having typical means for agitating the slurry, the problems of foam loss and nonuniform bubble sizes can be significantly reduced, while still achieving uniform dispersion of foam in the slurry, by positioning the foam inlet in the chamber so that the foam will experience less agitation than the rest of the slurry before it exits through the discharge outlet. This invention completely avoids the expense, complexity, and other difficulties of the prior art approach involving two mixing chambers, while achieving similar or better results. The invention also avoids the problems inherent in the prior art approach of adding excessive amounts of foaming agent to compensate for foam loss due to high agitation. The invention reduces foam loss, rather than utilizing (and wasting) more foaming agent, thus avoiding additional expense and the problem of adverse effects of high concentrations of foaming agent. Also, since the foam experiences less agitation, the chances for nonuniform bubble size production are lessened. Furthermore, these beneficial effects are even more pronounced in situations where the process is employing "unstable" foam to produce desirable larger bubble sizes.

Therefore, in some of its embodiments the invention provides a method of preparing a foamed gypsum product comprising, continuously and concurrently: inserting calcined gypsum and water into a mixing chamber through one or more inlets of the mixing chamber; agitating the contents of the mixing chamber to form an aqueous dispersion of the calcined gypsum; inserting an aqueous foam into the mixing chamber through an inlet positioned, relative to the inlet or inlets for the gypsum and the water and relative to a discharge outlet of the chamber, such that the foam is agitated less than the calcined gypsum to thereby minimize destruction of the foam while uniformly dispersing the foam in the aqueous gypsum dispersion; and discharging the contents of the mixing chamber through the discharge outlet to allow the calcined gypsum to form set gypsum having voids uniformly dispersed therein.

In typical slurry mixing chambers, significant beneficial effects of the invention can usually be realized simply by positioning the foam inlet "closer" to the discharge outlet than the inlets for calcined gypsum and water. By "closer", we mean that the path of the contents of the chamber, created by its shape and structure and by the typical means of agitation provided in the chamber, is shorter from inlet to discharge outlet for the foam than it is for the rest of the calcined gypsum slurry. Of course, the exact relative positioning of the various inlets must be customized for any particular mixing apparatus and slurry formulation to achieve optimum results, but this is within the skill of those in this art once they are informed, by the disclosure of the invention, of its basic principles and benefits.

An apparatus in accordance with the invention suitable for practicing the method of the invention described above comprises: a generally cylindrical mixing chamber having a generally vertical axis, upper and lower radial walls, an annular peripheral wall, an inlet or inlets for calcined gypsum and water in one or both of the radial walls proximate the vertical axis, an inlet for aqueous foam in or proximate the annular peripheral wall, an outlet in or proximate the annular peripheral wall for discharge of the contents of the chamber, and means for agitating the contents of the chamber and causing the contents to move centrifugally and exit through the discharge outlet. Except for the relative positioning of the inlets for gypsum, water, and foam, such apparatus is well known in the art.

The present inventors have further found unexpectedly, and rather surprisingly, that the invention can be even more beneficially practiced by relocating the foam inlet even further, that is, by removing the foam inlet from the mixing chamber altogether and, instead, positioning the inlet so that it inserts the foam directly into a discharge conduit which is connected to the discharge outlet of the mixing chamber. The discharge conduit receives the calcined gypsum slurry (containing no foam) that is discharged from the mixing chamber and conveys it further to be cast into molds or onto a moving surface. When a foam inlet is connected to the discharge conduit, and foam is inserted directly into the discharge conduit, rather than into the slurry mixing chamber, the foam will experience even less agitation. Therefore, the problems of foam loss and nonuniform bubble sizes will be even further reduced. What is very surprising is that this insertion of foam directly into the discharge conduit creates enough mixing action to uniformly disperse the foam throughout the gypsum slurry being conveyed by the discharge conduit.

Therefore, in some of its more preferred embodiments the invention provides a method of preparing a foamed gypsum product comprising, continuously and concurrently: inserting calcined gypsum and water into a mixing chamber through one or more inlets; agitating the contents of the mixing chamber to form an aqueous dispersion of the calcined gypsum; discharging the contents of the mixing chamber through a discharge outlet into a discharge conduit; inserting an aqueous foam through an inlet into the discharge conduit, such that the foam is mildly agitated to thereby minimize destruction of the foam while uniformly dispersing the foam in the aqueous gypsum dispersion; and discharging the resultant dispersion from the discharge conduit to allow the calcined gypsum to form set gypsum having voids uniformly dispersed therein.

An apparatus in accordance with the invention suitable for practicing this more preferred embodiment of the method of the invention comprises: a generally cylindrical mixing chamber having: a generally vertical axis, upper and lower radial walls, an annular peripheral wall, an inlet or inlets for calcined gypsum and water in one or both of the radial walls proximate the vertical axis, and an outlet in or proximate the annular peripheral wall for discharge of the contents of the chamber; a discharge conduit connected to the discharge outlet for accepting and conveying the discharged contents of the chamber; means for agitating the contents of the chamber and causing the contents to move centrifugally and exit through the discharge outlet and into the discharge conduit; and an inlet for aqueous foam in the discharge conduit. Except for the positioning of the foam inlet, such apparatus is well known in the art.

Furthermore, the present inventors have found that the present invention can be used to even further advantage in processes of preparing foamed gypsum board having hard edges. The inventors have recognized that in the practice of the present invention, there will be areas in the slurry mixing chamber that contain well-mixed calcined gypsum slurry but contain little or no foam (depending on whether the foam inlet has been positioned in the mixing chamber or in the discharge conduit). Therefore, in addition to obtaining all the benefits of the invention noted above, one or more "edge" streams can be diverted from the low- or no-foam area of the mixing chamber and then cast in contact with the sides of the "core" slurry stream that has been discharged from the normal or main discharge outlet of the mixing chamber. This completely avoids the complications and costs of the extra mixers and chemicals, and the waste of foam and foaming agent, that are involved in the prior art processes of producing hard-edged gypsum board. If desired, some foam can also be added to the edge stream or streams to limit the degree of edge hardness, but that foam will be at a lower concentration than the foam in the core stream.

Therefore, in some of its embodiments the invention provides a method of preparing a foamed gypsum board having a hard edge or edges, comprising, continuously and concurrently: mixing and agitating calcined gypsum and water to form an aqueous dispersion of the calcined gypsum; dividing the aqueous dispersion to form a core stream of the aqueous dispersion and one or more edge streams of the aqueous dispersion; mixing an aqueous foam into the core stream, such that the foam is mildly agitated to thereby minimize destruction of the foam while uniformly dispersing the foam in the aqueous dispersion; depositing the core stream onto a moving cover sheet; depositing the edge stream or streams onto the cover sheet contiguous to one or both edges of the deposited core stream; applying a second cover sheet over the deposited streams; and allowing the resultant assembly to set and dry.

An apparatus of the invention suitable for practicing the inventive method of preparing hard-edged foamed gypsum board comprises: a generally cylindrical mixing chamber having: a generally vertical axis, upper and lower radial walls, an annular peripheral wall, an inlet or inlets for calcined gypsum and water in one or both of the radial walls proximate the vertical axis, and at least two outlets in or proximate the annular peripheral wall for discharge of the contents of the chamber; discharge conduits connected to the discharge outlets for accepting and conveying the discharged contents of the chamber; means for agitating the contents of the chamber and causing the contents to move centrifugally and exit through the discharge outlets and into the discharge conduits; and an inlet for aqueous foam in at least one of the discharge conduits. Except for the positioning of the inlet or inlets for foam, such apparatus is well known in the art.

BRIEF DESCRIPTION OF THE DRAWINGS

In the description of the preferred embodiments of the invention presented below, reference is made to the accompanying drawings, in which.

DESCRIPTION OF PREFERRED EMBODIMENTS

As previously mentioned, the invention can be practiced employing apparatus similar to apparatus typically employed in the prior art practice of preparing calcined gypsum slurry and discharging the slurry to form a set gypsum product. The essential difference in the method and apparatus of this invention from methods and apparatus of the prior art employed to prepare foamed gypsum products, resides in the manner and means of mixing the aqueous foam into the calcined gypsum slurry.

The method of the present invention differs from the prior art by dispersing the aqueous foam uniformly in the calcined gypsum slurry under conditions of less agitation than the calcined gypsum is subjected to, in order to avoid foam loss, nonuniform void sizes, and inordinate foaming agent consumption. This is accomplished without resort to use of multiple mixers, by inserting the aqueous foam into the slurry closer to the point of discharge of the slurry than was heretofore contemplated or thought possible, while still achieving a uniform dispersion.

Apparatus provided by the invention differs essentially from apparatus of the prior art, in that an inlet for aqueous foam is provided in the slurry mixing chamber closer to the discharge outlet than the inlet for calcined gypsum, or, preferably, the foam inlet is positioned outside of the mixing chamber entirely, i.e., in the discharge conduit connected to the discharge outlet of the mixing chamber.

In both the method and apparatus of the invention the exact point of optimum insertion of the foam into the slurry may vary along with the particular type of mixing apparatus and slurry and foam formulations being employed. The optimum point will be that point at which the foam will undergo just enough mixing action to become uniformly dispersed in the slurry. It is at that point that the problems of foam loss and nonuniform bubble size will be minimized.

In some embodiments of the practice of the invention, e.g., wherein an "unstable" foam is being employed, the present inventors have found that foam loss has been reduced to such an extent that foaming agent consumption can be reduced by as much as eighty percent. Even greater reductions in consumption may be possible in some situations.

Figure 1:
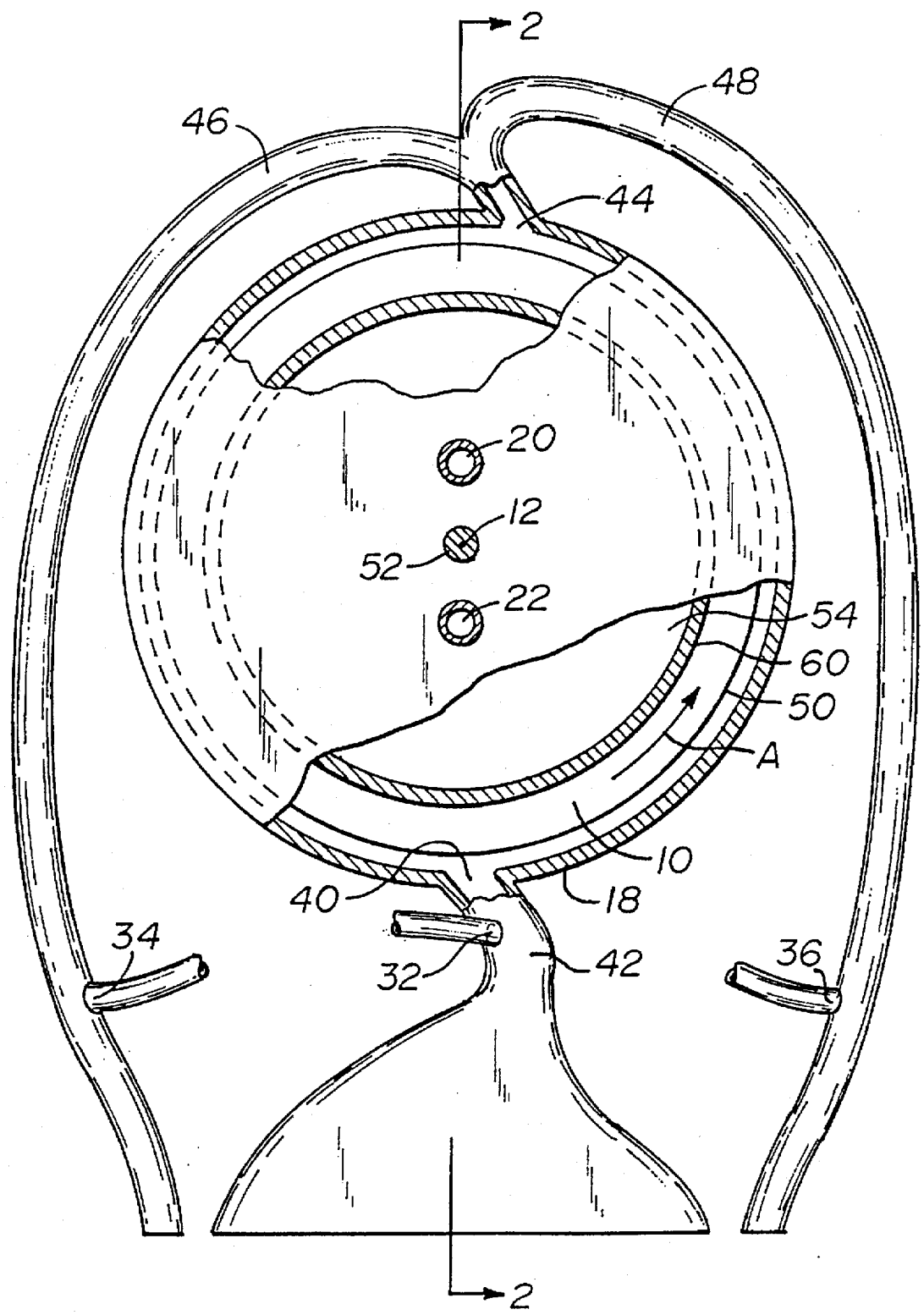
FIG. 1 is a fragmentary somewhat schematic cross-sectional top view of an apparatus in accordance with the invention which is useful for carrying out an embodiment of a method of the invention.
Figure 2:
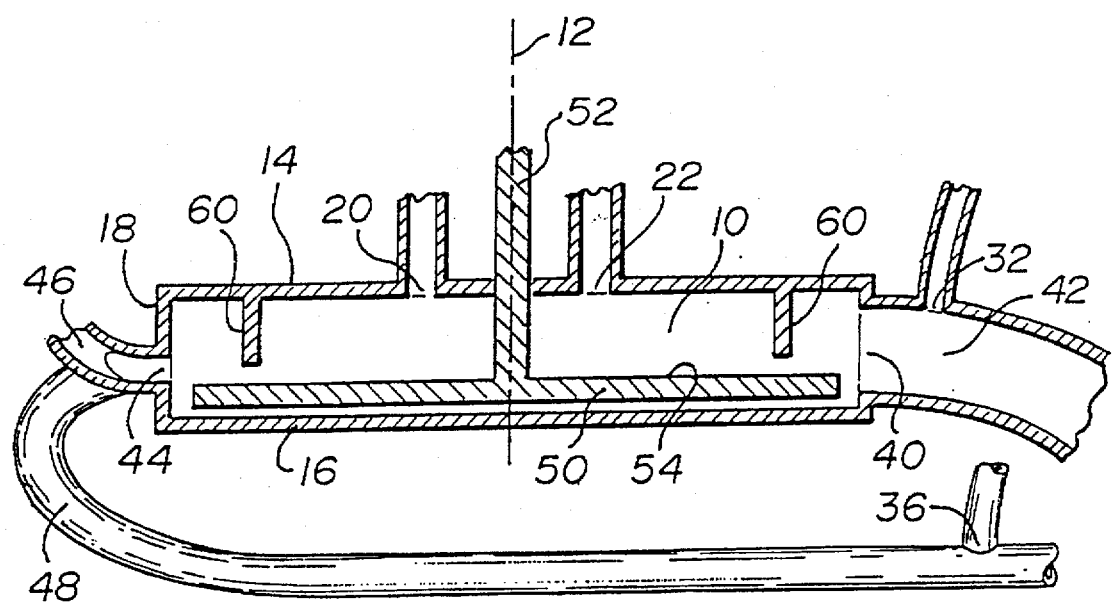
FIG. 2 is a fragmentary somewhat schematic cross-sectional side view, taken along the line 2—2, of part of the apparatus of FIG. 1.

For description of a preferred embodiment of the invention, reference is made to FIGS. 1 and 2, which somewhat schematically illustrate fragmentary cross-sectional top and side views, respectively, of an apparatus in accordance with the invention.

These Figures depict a mixing chamber 10 of generally cylindrical shape, having a generally vertical axis 12, an upper radial wall 14, a lower radial wall 16, and an annular peripheral wall 18.

An inlet 20 for calcined gypsum and an inlet 22 for water are both positioned in upper radial wall 14 proximate vertical axis 12. It should be appreciated that these inlets are connected to gypsum and water supply containers, not shown, such that gypsum and water can be supplied to mixing chamber 10 by simple gravity feed. Also, other materials in addition to gypsum and water, often employed in slurries to prepare gypsum products (e.g., accelerators, retarders, fillers, binders, etc.), can also be supplied through these inlets or through other inlets similarly positioned.

Mixing chamber 10 also contains an agitator 50 comprising a circular disc 54 attached to a generally vertical shaft 52. Shaft 52 is positioned concentric to vertical axis 12 and extends through upper radial wall 14. It is connected to conventional means (e.g., a motor), not shown, for rotating shaft 52 and connected disc 54 in a counterclockwise direction, indicated by arrow A, at whatever speed is appropriate to agitate and mix the contents of the mixing chamber and direct the resultant aqueous dispersion (the slurry) in a generally centrifugal direction (mostly in a counterclockwise outward spiral). It should be appreciated that this depiction of an agitator is relatively simplistic and meant only to indicate the basic principles of agitators commonly employed in gypsum slurry mixing chambers in the art. Many different, and often more complex, agitator designs (having vertically extending pins or paddles, different shapes, etc.) can also be employed.

Mixing chamber 10 also has an annular ring 60 connected to and extending down from radial wall 14. This ring is concentric to axis 12. It is a conventional feature, sometimes referred to as a "lump ring". It aids the mixing action in the chamber and prevents any larger agglomerations (lumps) of material (e.g., calcined gypsum) from exiting the chamber before becoming more finely divided and well-dispersed.

There is a main discharge outlet 40 in peripheral wall 18 for discharge of the major portion (the "core stream") of the well-mixed slurry into connected discharge conduit 42. In alternative embodiments this outlet can be positioned in a different location (e.g., in lower radial wall 16) but will usually be at least proximate peripheral wall 18. Discharge conduit 42 is provided to convey the gypsum slurry to a point where it will be cast into molds or onto a moving surface to set and dry. As depicted in FIG. 1, the discharge conduit widens out. This is suitable for casting a middle ("core") portion, e.g., in forming a gypsum board product, but other configurations suitable for other final products are, of course, possible.

There is an auxiliary discharge outlet 44 in peripheral wall 18 for discharge of a minor portion (the "edge stream") of the well-mixed slurry into connected branched-out discharge conduits 46 and 48. Outlet 44 serves to divide out an edge stream in certain embodiments, but will not be present in other embodiments wherein it is not desired to divide out a separate slurry stream. It is also possible to position this outlet in a different location (e.g., in lower radial wall 16), but it will usually be positioned at least proximate peripheral wall 18, in order to ensure that only well-mixed slurry will exit through it. Discharge conduits 46 and 48 are provided to convey separate streams of gypsum slurry to be cast and then set and dry. As depicted in FIG. 1, these conduits direct slurry to be deposited contiguous to the edges of the core slurry stream deposited from conduit 42, e.g,, in order to form hard edges in a foamed gypsum board product. These conduits will, of course, not be present in other embodiments wherein it is not desired to convey any such edge streams.

As will be apparent to one of ordinary skill in the art of preparation of gypsum products, all of the features of the apparatus of FIGS. 1 and 2 described above are well-known and conventional. The following features, however, are improvements in accordance with the present invention.

An inlet 32 for aqueous foam is positioned in discharge conduit 42. This inlet is provided to insert aqueous foam, provided and conveyed in a conventional manner from a conventional foam generator (not shown), directly into discharge conduit 42. This will usually be the preferred configuration of an apparatus in accordance with the invention. As previously mentioned, the exact positioning of this inlet in the discharge conduit will be determined in accordance with the particular type of mixing apparatus and slurry and foam formulations being employed.

It should be apparent that in FIGS. 1 and 2 no aqueous foam inlet is positioned to insert foam directly into mixing chamber 10. Therefore, slurry exiting through auxiliary discharge outlet 44 will contain no foam. While this desirably provides slurry that can be employed to produce harder edges for gypsum board, it is known that completely unfoamed gypsum may in fact be too hard to serve optimally as edge material for foamed core gypsum board (see, e.g., U.S. Pat. No. 2,985,219). Therefore, as shown in the Figures, inlets 34 and 36 are positioned in discharge conduits 46 and 48, respectively. These inlets are provided to insert a relatively low concentration of aqueous foam, provided and conveyed in a conventional manner from a conventional foam generator (not shown), directly into discharge conduits 46 and 48. Again, the exact positioning of these inlets in their respective discharge conduits will be determined in accordance with the particular mixing parameters and slurry and foam formulations being employed.

While the configuration of FIGS. 1 and 2 will usually be the preferred configuration of an apparatus in accordance with the invention, in some situations (e.g., with some mixing apparatus, mixing parameters, slurry formulations, and/or foam formulations), insertion of aqueous foam directly into discharge conduit 42 might not provide adequate mixing to achieve uniform dispersion of the foam in the slurry. In such situations it will be preferred to employ apparatus configured as illustrated in FIGS. 3 and 4.

Figure 3:
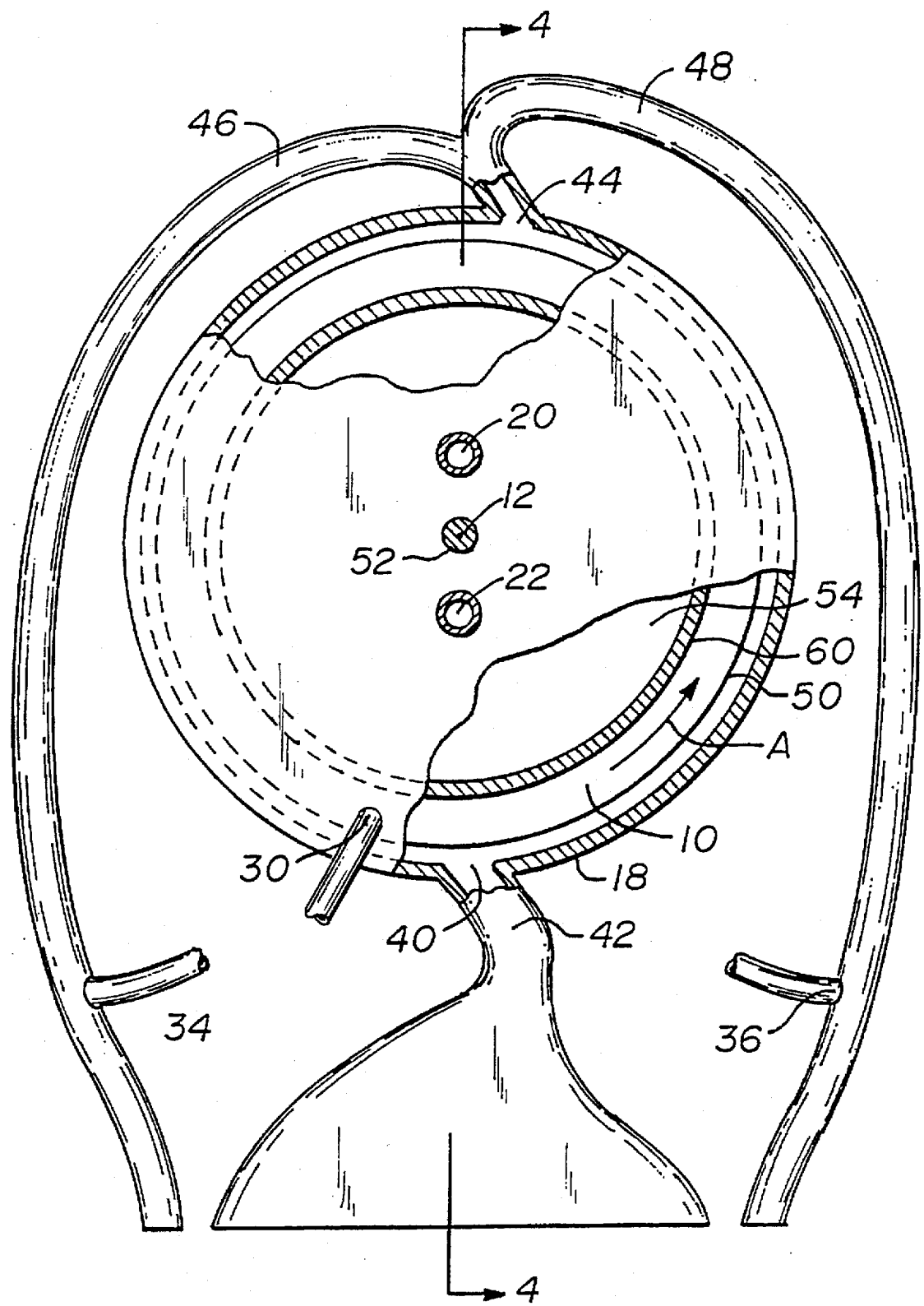
FIG. 3 is a fragmentary somewhat schematic cross-sectional top view of an alternative apparatus in accordance with the invention which is useful for carrying out an alternative embodiment of a method of the invention.
Figure 4:
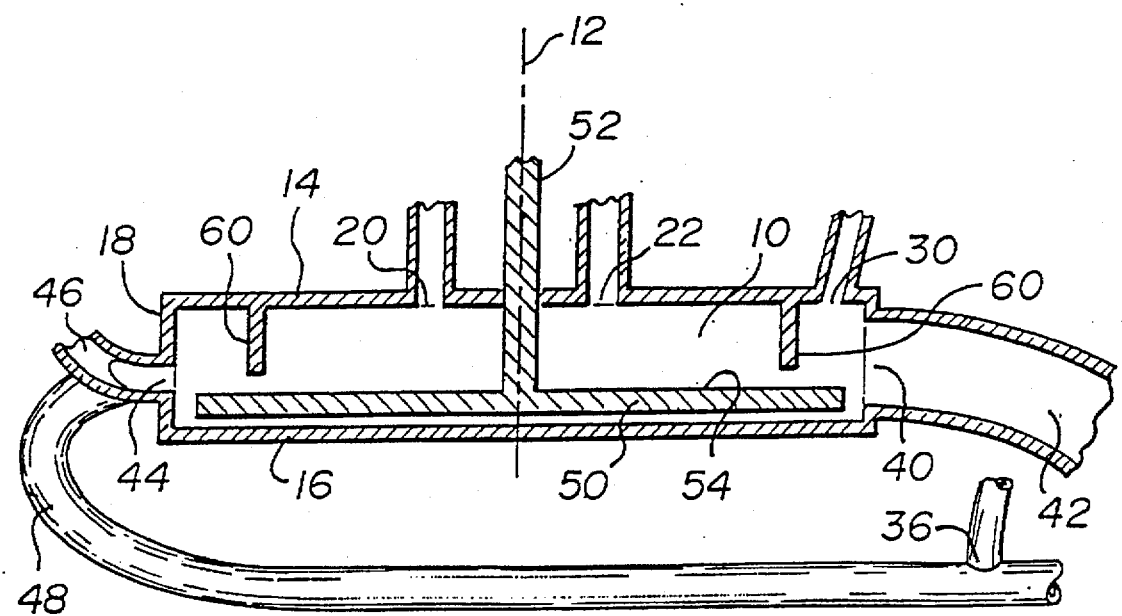
FIG. 4 is a fragmentary somewhat schematic cross-sectional side view, taken along the line 4—4, of part of the apparatus of FIG. 3.

FIGS. 3 and 4 show apparatus having all the same features and configurations as in FIGS. 1 and 2, respectively, except that in FIGS. 3 and 4 an inlet 30 for aqueous foam, instead of being positioned in discharge conduit 42, is positioned in upper radial wall 14, proximate annular peripheral wall 18, and much closer to discharge outlet 40 than inlets 20 and 22 (the inlets for gypsum and water, respectively). With this configuration the aqueous foam will still undergo considerably less agitation than the rest of the calcined gypsum slurry, such that foam loss and nonuniform bubble size will still be greatly avoided, but such that the foam will be agitated more than in the configuration of FIGS. 1 and 2, in order to ensure uniform dispersion of the foam in the slurry in situations in which the configuration of FIGS. 1 and 2 might not be adequate for that purpose. Alternative positions for inlet 30 are also possible, such as in the annular peripheral wall and/or further "upstream" (in regard to the path of travel of the contents of the mixing chamber), wherein the foam will still undergo considerably less agitation than the rest of the calcined gypsum slurry.

It should also be appreciated that, because of the proximity of foam inlet 30 to discharge outlet 40 and because of the path of travel of the contents of the mixing chamber, very little foam will travel to other areas of the mixing chamber, such as the area proximate auxiliary discharge outlet 44. Therefore, there will still be very little concentration of foam in the slurry stream that exits through outlet 44.

In regard to foaming agents suitable for generating aqueous foams useful in preferred embodiments of the method of the invention, any of the conventional foaming agents known to be useful in preparing foamed gypsum products can be employed. Many such foaming agents are well known and readily available commercially, e.g., from Henkel Corporation in Ambler, Pa. For further descriptions of useful foaming agents, see, for example: U.S. Pat. Nos. 4,676,835; 5,158,612; and 5,240,639; copending U.S. patent application Ser. No. 08/311,687, filed Sep. 23, 1994; and PCT International Application Publication WO 95/16515, published Jun. 22, 1995.

As previously mentioned, in many cases it will be preferred to form relatively large voids in the gypsum product, in order to best maintain its strength. This can be accomplished by employing a foaming agent that generates foam that is relatively unstable when in contact with calcined gypsum slurry. Preferably, this is accomplished by blending a major amount of foaming agent known to generate relatively unstable foam, with a minor amount of foaming agent known to generate relatively stable foam.

Such a foaming agent mixture can be pre-blended "off-line", i.e., separate from the process of preparing foamed gypsum product. However, it is preferable to blend such foaming agents concurrently and continuously, as an integral "on-line" part of the process. This can be accomplished, for example, by pumping separate streams of the different foaming agents and bringing the streams together at, or just prior to, the foam generator that is employed to generate the stream of aqueous foam which is then inserted into and mixed with the calcined gypsum slurry. By blending in this manner, the ratio of foaming agents in the blend can be simply and efficiently adjusted (for example, by changing the flow rate of one or both of the separate streams) to achieve the desired void characteristics in the foamed gypsum product. Such adjustment will be made in response to an examination of the final product to determine whether such adjustment is needed. Further description of such "on-line" blending and adjusting can be found in copending U.S. patent application Ser. No. 08/311,687, filed Sep. 23, 1994.

An example of one type of foaming agent, useful to generate unstable foams, has the formula

$$ROSO_3 \ominus M \oplus \quad (Q)$$

wherein R is an alkyl group containing from 2 to 20 carbon atoms, and M is a cation. Preferably, R is an alkyl group containing from 8 to 12 carbon atoms.

An example of one type of foaming agent, useful to generate stable foams, has the formula

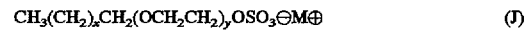

$$CH_3(CH_2)_xCH_2(OCH_2CH_2)_yOSO_3 \ominus M \oplus \quad (J)$$

wherein X is a number from 2 to 20, Y is a number from 0 to 10 and is greater than 0 in at least 50 weight percent of the foaming agent, and M is a cation.

In some preferred embodiments of the invention, foaming agents having the formulas (Q) and (J) above are blended together, such that the formula (Q) foaming agent and the portion of the formula (J) foaming agent wherein Y is 0, together constitute from 86 to 99 weight percent of the resultant blend of foaming agents.

In some preferred embodiments of the invention, the aqueous foam has been generated from a pre-blended foaming agent having the formula

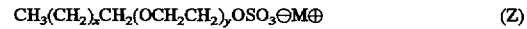

$$CH_3(CH_2)_xCH_2(OCH_2CH_2)_yOSO_3 \ominus M \oplus \quad (Z)$$

wherein X is a number from 2 to 20, Y is a number from 0 to 10 and is 0 in at least 50 weight percent of the foaming agent, and M is a cation. Preferably, Y is 0 in from 86 to 99 weight percent of the formula (Z) foaming agent.

The calcined gypsum employed as a starting material in the method of the invention can be alpha calcium sulfate hemihydrate, beta calcium sulfate hemihydrate, water-soluble calcium sulfate anhydrite, or mixtures thereof, from natural or synthetic sources. As previously mentioned, in addition to the aqueous foam, other conventional additives can be added to the calcined gypsum slurry in customary amounts to impart desirable properties and to facilitate manufacturing, such as, for example, set accelerators, set retarders, binders, adhesives, dispersing aids, fillers and mixtures thereof.

In a preferred method of the invention, i.e., a method of preparing a foamed gypsum board having hard edges, the following steps (referring to FIGS. 1 and 2) are carried out continuously and concurrently.

Calcined gypsum (usually in dry particulate form), water, and any other desired additives (except aqueous foam) are added to mixing chamber 10 through inlets 20 and 22. They are agitated and mixed to form a calcined gypsum slurry by the action of agitator 50. The agitator also causes the slurry to move generally centrifugally (mostly in a counterclockwise outward spiral), to cause a major portion of the slurry (the core stream) to exit through outlet 40 and pass through conduit 42, and to cause a minor portion of the slurry (the edge stream) to exit through outlet 44 and pass through conduits 46 and 48.

A stream of aqueous foam, generated by a foam generator from air, water, and a foaming agent chosen as previously described, is pumped into conduit 42 through inlet 32 at a flow rate appropriate to create the desired concentration of foam in the core stream of slurry. The mixing action (agitation) created by the flow of the stream of foam and the core stream, as they come together and pass through conduit 42, is just enough to disperse the foam uniformly in the core stream, while minimizing destruction of the foam. In a similar manner, aqueous foam is pumped into conduits 46 and 48, through inlets 34 and 36, respectively, but at a flow rate appropriate to create a concentration of foam in the edge streams that is significantly lower than the concentration created in the core stream.

The core stream is deposited from conduit 42 onto a moving conventional cover sheet, such as a multi-ply paper (not shown in the drawings). The edge streams are deposited from conduits 46 and 48 onto the moving cover sheet contiguous to the edges of the core stream. In further conventional steps (not shown), another cover sheet is then placed on top of the combined core and edge slurries, so that the slurry is sandwiched between two moving cover sheets which become the facings of the resultant gypsum board. The thickness of the resultant board is controlled by a forming roll, and the sides of the board are covered by employing appropriate mechanical devices to continuously score, fold and glue the overlapping edges of the paper cover sheets. Additional guides maintain board thickness and width as the setting slurry travels on a moving belt. The board panels are cut, trimmed and passed to dryers to dry the set, but still somewhat wet, boards.

The invention has been described in detail, with particular reference to certain preferred embodiments thereof, but it should be appreciated that variations and modifications can be effected within the spirit and scope of the invention.

For further description of conventional prior art methods and apparatus for mixing and preparing foamed gypsum products, see, for example, U.S. Pat. Nos. 2,639,901; 2,762,738; 2,985,219; 3,343,818; and 4,279,673 and European Patent Application Publication 0 613 764 A1, published Sep. 7, 1994.

What is claimed is:

1. A method of preparing a foamed gypsum board comprising, continuously and concurrently:

inserting calcined gypsum and water into a mixing chamber through one or more inlets of the mixing chamber;

agitating the contents of the mixing chamber to form an aqueous dispersion of the calcined gypsum;

inserting an aqueous foam into the mixing chamber through an inlet positioned, relative to the inlet or inlets for the gypsum and the water and relative to a discharge outlet of the chamber, such that the foam is agitated less than the calcined gypsum to thereby minimize destruction of the foam while uniformly dispersing the foam in the aqueous gypsum dispersion;

discharging the contents of the mixing chamber through the discharge outlet and depositing the contents onto a moving cover sheet:

applying a second cover sheet over the deposited contents; and allowing the resultant assembly to set and dry such that the calcined gypsum forms set gypsum having voids uniformly dispersed therein.

2. The method of claim 1, wherein: the mixing chamber is generally cylindrical and has a generally vertical axis; the inlet or inlets for gypsum and water are proximate the axis; the discharge outlet and the inlet for the aqueous foam are in or proximate an annular peripheral wall of the cylindrical chamber; and the agitating of the contents of the chamber causes the contents to move centrifugally until they exit through the discharge outlet.

3. The method of claim 1, wherein the aqueous foam is unstable in the presence of the dispersion of calcined gypsum, and the voids formed in the set gypsum are relatively large.

4. The method of claim 1, wherein: the aqueous foam has been formed from a mixture of a major amount of a first foaming agent that forms aqueous foam that is unstable in the presence of the dispersion of calcined gypsum and a minor amount of a second foaming agent that forms aqueous foam that is stable in the presence of the dispersion of calcined gypsum; and the voids formed in the set gypsum are relatively large.

5. The method of claim 4, wherein: the first foaming agent has the formula

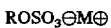

wherein R is an alkyl group containing from 2 to 20 carbon atoms, and M is a cation; and the second foaming agent has the formula

wherein X is a number from 2 to 20, Y is a number from 0 to 10 and is greater than 0 in at least 50 weight percent of the second foaming agent, and M is a cation.

6. The method of claim 5, wherein the first foaming agent and the portion of the second foaming agent wherein Y is 0 together constitute from 86 to 99 weight percent of the mixture of foaming agents.

7. The method of claim 5, wherein R is an alkyl group containing from 8 to 12 carbon atoms.

8. The method of claim 4, comprising, as a concurrent part of the method, forming the mixture of first and second foaming agents by blending an aqueous stream of the first foaming agent with an aqueous stream of the second foaming agent.

9. The method of claim 8, comprising adjusting the relative amounts of first and second foaming agents in the mixture of foaming agents by adjusting the relative flow rates of the aqueous streams of first and second foaming agents.

10. The method of claim 1, wherein: the aqueous foam has been formed from a mixture of from 86 to 99 weight percent of a first foaming agent that forms aqueous foam that is unstable in the presence of the dispersion of calcined gypsum and from 14 to 1 weight percent of a second foaming agent that forms aqueous foam that is stable in the presence of the dispersion of calcined gypsum; and the voids formed in the set gypsum are relatively large.

11. The method of claim 1, wherein the aqueous foam has been formed from a foaming agent having the formula $$CH_3(CH_2)_xCH_2(OCH_2CH_2)_yOSO_3^{\ominus}M^{\oplus}$$

wherein X is a number from 2 to 20, Y is a number from 0 to 10 and is 0 in at least 50 weight percent of the foaming agent, and M is a cation.

12. The method of claim 11, wherein Y is 0 in from 86 to 99 weight percent of the foaming agent.

13. A method of preparing a foamed gypsum board comprising, continuously and concurrently:
inserting calcined gypsum and water into a mixing chamber through one or more inlets of the mixing chamber;
agitating the contents of the mixing chamber to form an aqueous dispersion of the calcined gypsum;
inserting an aqueous foam into the mixing chamber through an inlet located closer to a discharge outlet of the mixing chamber than the inlet or inlets for the calcined gypsum and water, such that the foam is agitated less than the calcined gypsum to thereby minimize destruction of the foam while uniformly dispersing the foam in the aqueous gypsum dispersion;
discharging the contents of the mixing chamber through the discharge outlet and depositing the contents onto a moving cover sheet:
applying a second cover sheet over the deposited contents: and
allowing the resultant assembly to set and dry such that the calcined gypsum forms set gypsum having voids uniformly dispersed therein.

14. The method of claim 13, wherein: the mixing chamber is generally cylindrical and has a generally vertical axis; the inlet or inlets for gypsum and water are proximate the axis; the discharge outlet and the inlet for the aqueous foam are in or proximate an annular peripheral wall of the cylindrical chamber; and the agitating of the contents of the chamber causes the contents to move centrifugally until they exit through the discharge outlet.

15. The method of claim 13, wherein the aqueous foam is unstable in the presence of the dispersion of calcined gypsum, and the voids formed in the set gypsum are relatively large.

16. The method of claim 13, wherein: the aqueous foam has been formed from a mixture of a major amount of a first foaming agent that forms aqueous foam that is unstable in the presence of the dispersion of calcined gypsum and a minor amount of a second foaming agent that forms aqueous foam that is stable in the presence of the dispersion of calcined gypsum; and the voids formed in the set gypsum are relatively large.

17. The method of claim 16, wherein: the first foaming agent has the formula $$ROSO_3^{\ominus}M^{\oplus}$$

wherein R is an alkyl group containing from 2 to 20 carbon atoms, and M is a cation; and the second foaming agent has the formula $$CH_3(CH_2)_xCH_2(OCH_2CH_2)_yOSO_3^{\ominus}M^{\oplus}$$

wherein X is a number from 2 to 20, Y is a number from 0 to 10 and is greater than 0 in at least 50 weight percent of the second foaming agent, and M is a cation.

18. The method of claim 17, wherein the first foaming agent and the portion of the second foaming agent wherein Y is 0 together constitute from 86 to 99 weight percent of the mixture of foaming agents.

19. The method of claim 17, wherein R is an alkyl group containing from 8 to 12 carbon atoms.

20. The method of claim 16, comprising, as a concurrent part of the method, forming the mixture of first and second foaming agents by blending an aqueous stream of the first foaming agent with an aqueous stream of the second foaming agent.

21. The method of claim 20, comprising adjusting the relative amounts of first and second foaming agents in the mixture of foaming agents by adjusting the relative flow rates of the aqueous streams of first and second foaming agents.

22. The method of claim 13, wherein: the aqueous foam has been formed from a mixture of from 86 to 99 weight percent of a first foaming agent that forms aqueous foam that is unstable in the presence of the dispersion of calcined gypsum and from 14 to 1 weight percent of a second foaming agent that forms aqueous foam that is stable in the presence of the dispersion of calcined gypsum; and the voids formed in the set gypsum are relatively large.

23. The method of claim 13, wherein the aqueous foam has been formed from a foaming agent having the formula $$CH_3(CH_2)_xCH_2(OCH_2CH_2)_yOSO_3^{\ominus}M^{\oplus}$$

wherein X is a number from 2 to 20, Y is a number from 0 to 10 and is 0 in at least 50 weight percent of the foaming agent, and M is a cation.

24. The method of claim 23, wherein Y is 0 in from 86 to 99 weight percent of the foaming agent.

25. A method of preparing a foamed gypsum board comprising, continuously and concurrently:
inserting calcined gypsum and water into a mixing chamber through one or more inlets;
agitating the contents of the mixing chamber to form an aqueous dispersion of the calcined gypsum;
discharging the contents of the mixing chamber through a discharge outlet into a discharge conduit;
inserting an aqueous foam through an inlet into the discharge conduit, such that the foam is mildly agitated to thereby minimize destruction of the foam while uniformly dispersing the foam in the aqueous gypsum dispersion;
discharging the resultant dispersion from the discharge conduit and depositing the dispersion onto a moving cover sheet:
applying a second cover sheet over the deposited dispersion; and
allowing the resultant assembly to set and dry such that the calcined gypsum forms set gypsum having voids uniformly dispersed therein.

26. The method of claim 25, wherein the aqueous foam is unstable in the presence of the dispersion of calcined gypsum, and the voids formed in the set gypsum are relatively large.

27. The method of claim 25, wherein: the aqueous foam has been formed from a mixture of a major amount of a first foaming agent that forms aqueous foam that is unstable in the presence of the dispersion of calcined gypsum and a minor amount of a second foaming agent that forms aqueous foam that is stable in the presence of the dispersion of calcined gypsum; and the voids formed in the set gypsum are relatively large.

28. The method of claim 27, wherein: the first foaming agent has the formula $$ROSO_3^{\ominus}M^{\oplus}$$

wherein R is an alkyl group containing from 2 to 20 carbon atoms, and M is a cation; and the second foaming agent has the formula $CH_3(CH_2)_xCH_2(OCH_2CH_2)_yOSO_3^\ominus M^\oplus$ wherein X is a number from 2 to 20, Y is a number from 0 to 10 and is greater than 0 in at least 50 weight percent of the second foaming agent, and M is a cation.

29. The method of claim 28, wherein the first foaming agent and the portion of the second foaming agent wherein Y is 0 together constitute from 86 to 99 weight percent of the mixture of foaming agents.

30. The method of claim 28, wherein R is an alkyl group containing from 8 to 12 carbon atoms.

31. The method of claim 27, comprising, as a concurrent part of the method, forming the mixture of first and second foaming agents by blending an aqueous stream of the first foaming agent with an aqueous stream of the second foaming agent.

32. The method of claim 31, comprising adjusting the relative amounts of first and second foaming agents in the mixture of foaming agents by adjusting the relative flow rates of the aqueous streams of first and second foaming agents.

33. The method of claim 25, wherein: the aqueous foam has been formed from a mixture of from 86 to 99 weight percent of a first foaming agent that forms aqueous foam that is unstable in the presence of the dispersion of calcined gypsum and from 14 to 1 weight percent of a second foaming agent that forms aqueous foam that is stable in the presence of the dispersion of calcined gypsum; and the voids formed in the set gypsum are relatively large.

34. The method of claim 25, wherein the aqueous foam has been formed from a foaming agent having the formula $CH_3(CH_2)_xCH_2(OCH_2CH_2)_yOSO_3^\ominus M^\oplus$ wherein X is a number from 2 to 20, Y is a number from 0 to 10 and is 0 in at least 50 weight percent of the foaming agent, and M is a cation.

35. The method of claim 34, wherein Y is 0 in from 86 to 99 weight percent of the foaming agent.

36. A method of preparing a foamed gypsum board having a hard edge or edges, comprising, continuously and concurrently:

mixing and agitating calcined gypsum and water to form an aqueous dispersion of the calcined gypsum;

dividing the aqueous dispersion to form a core stream of the aqueous dispersion and one or more edge streams of the aqueous dispersion;

mixing an aqueous foam into the core stream, such that the foam is mildly agitated to thereby minimize destruction of the foam while uniformly dispersing the foam in the aqueous dispersion;

depositing the core stream onto a moving cover sheet;

depositing the edge stream or streams onto the cover sheet contiguous to one or both edges of the deposited core stream;

applying a second cover sheet over the deposited streams; and allowing the resultant assembly to set and dry such that the calcined gypsum forms set gypsum and the set gypsum in the deposited core stream has voids uniformly dispersed therein.

37. The method of claim 36, further comprising, continuously and concurrently:

mixing an aqueous foam into the edge stream or streams, such that the foam is mildly agitated to thereby minimize destruction of the foam while uniformly dispersing the foam in the aqueous dispersion and such that the concentration of the foam in the edge stream or streams is lower than the concentration of foam in the core stream.

38. The method of claim 36, wherein the aqueous foam is unstable in the presence of the dispersion of calcined gypsum, and the voids formed in the set gypsum are relatively large.

39. The method of claim 36, wherein: the aqueous foam has been formed from a mixture of a major amount of a first foaming agent that forms aqueous foam that is unstable in the presence of the dispersion of calcined gypsum and a minor amount of a second foaming agent that forms aqueous foam that is stable in the presence of the dispersion of calcined gypsum; and the voids formed in the set gypsum are relatively large.

40. The method of claim 39, wherein: the first foaming agent has the formula $ROSO_3^\ominus M^\oplus$ wherein R is an alkyl group containing from 2 to 20 carbon atoms, and M is a cation; and the second foaming agent has the formula $CH_3(CH_2)_xCH_2(OCH_2CH_2)_yOSO_3^\ominus M^\oplus$ wherein X is a number from 2 to 20, Y is a number from 0 to 10 and is greater than 0 in at least 50 weight percent of the second foaming agent, and M is a cation.

41. The method of claim 40, wherein the first foaming agent and the portion of the second foaming agent wherein Y is 0 together constitute from 86 to 99 weight percent of the mixture of foaming agents.

42. The method of claim 40, wherein R is an alkyl group containing from 8 to 12 carbon atoms.

43. The method of claim 39, comprising, as a concurrent part of the method, forming the mixture of first and second foaming agents by blending an aqueous stream of the first foaming agent with an aqueous stream of the second foaming agent.

44. The method of claim 43, comprising adjusting the relative amounts of first and second foaming agents in the mixture of foaming agents by adjusting the relative flow rates of the aqueous streams of first and second foaming agents.

45. The method of claim 36, wherein: the aqueous foam has been formed from a mixture of from 86 to 99 weight percent of a first foaming agent that forms aqueous foam that is unstable in the presence of the dispersion of calcined gypsum and from 14 to 1 weight percent of a second foaming agent that forms aqueous foam that is stable in the presence of the dispersion of calcined gypsum; and the voids formed in the set gypsum are relatively large.

46. The method of claim 36, wherein the aqueous foam has been formed from a foaming agent having the formula $CH_3(CH_2)_xCH_2(OCH_2CH_2)_yOSO_3^\ominus M^\oplus$ wherein X is a number from 2 to 20, Y is a number from 0 to 10 and is 0 in at least 50 weight percent of the foaming agent, and M is a cation.

47. The method of claim 46, wherein Y is 0 in from 86 to 99 weight percent of the foaming agent.

* * * * *